Jan. 19, 1937.  D. M. SOLENBERGER  2,068,114
PISTON RING
Filed Jan. 29, 1934   3 Sheets-Sheet 3
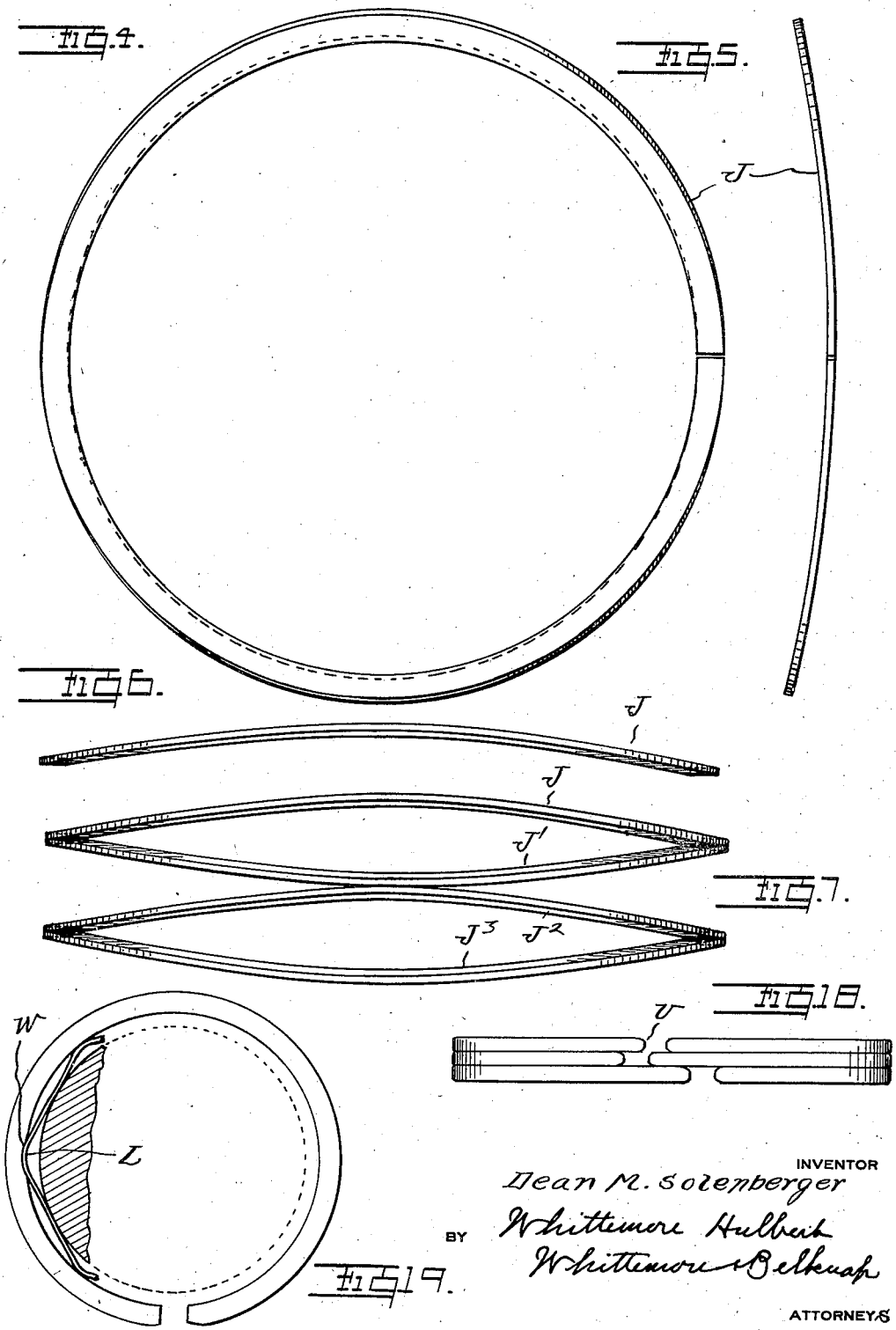
INVENTOR
Dean M. Solenberger
BY Whittemore Hulbert
Whittemore & Belknap
ATTORNEYS Patented Jan. 19, 1937

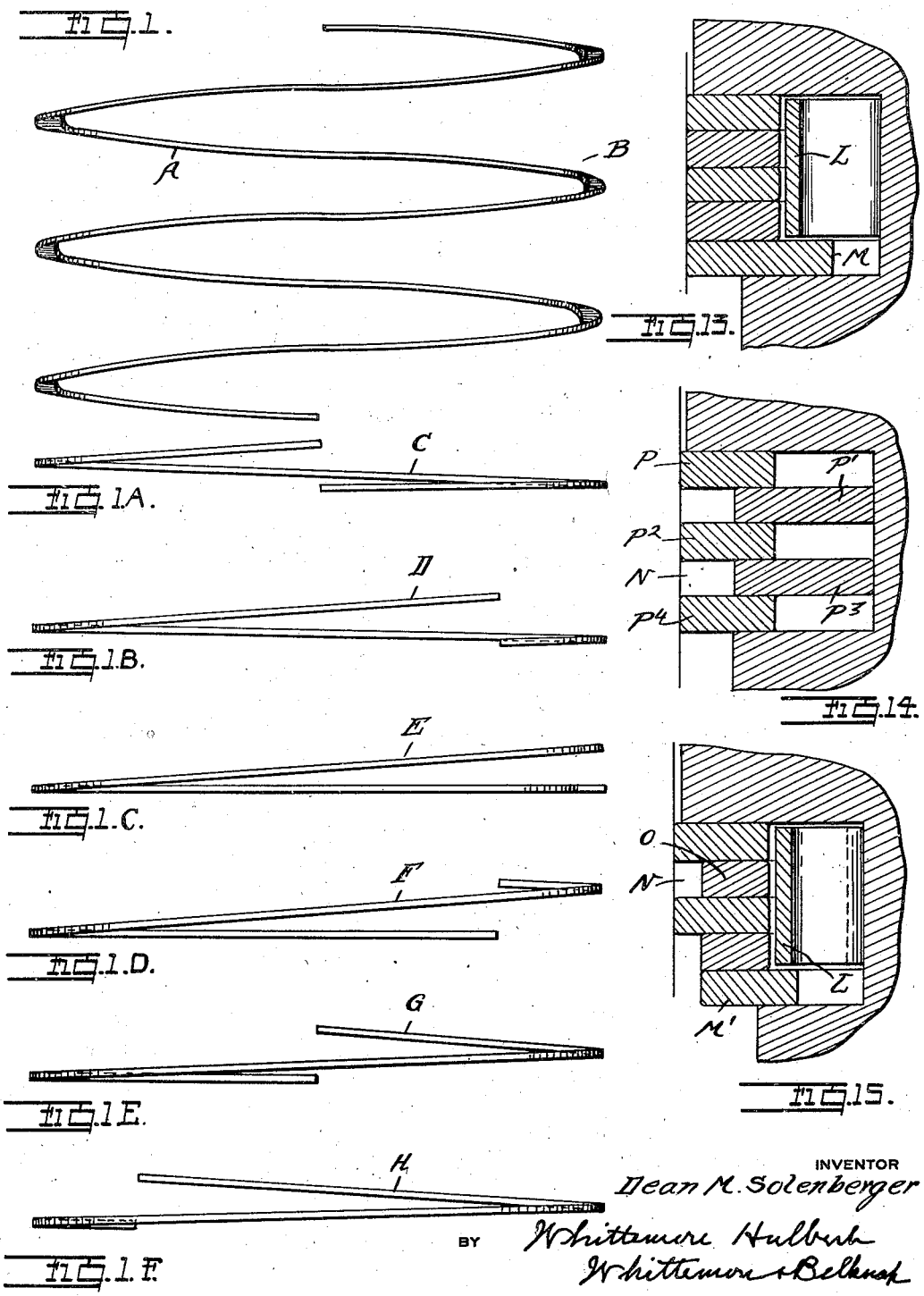

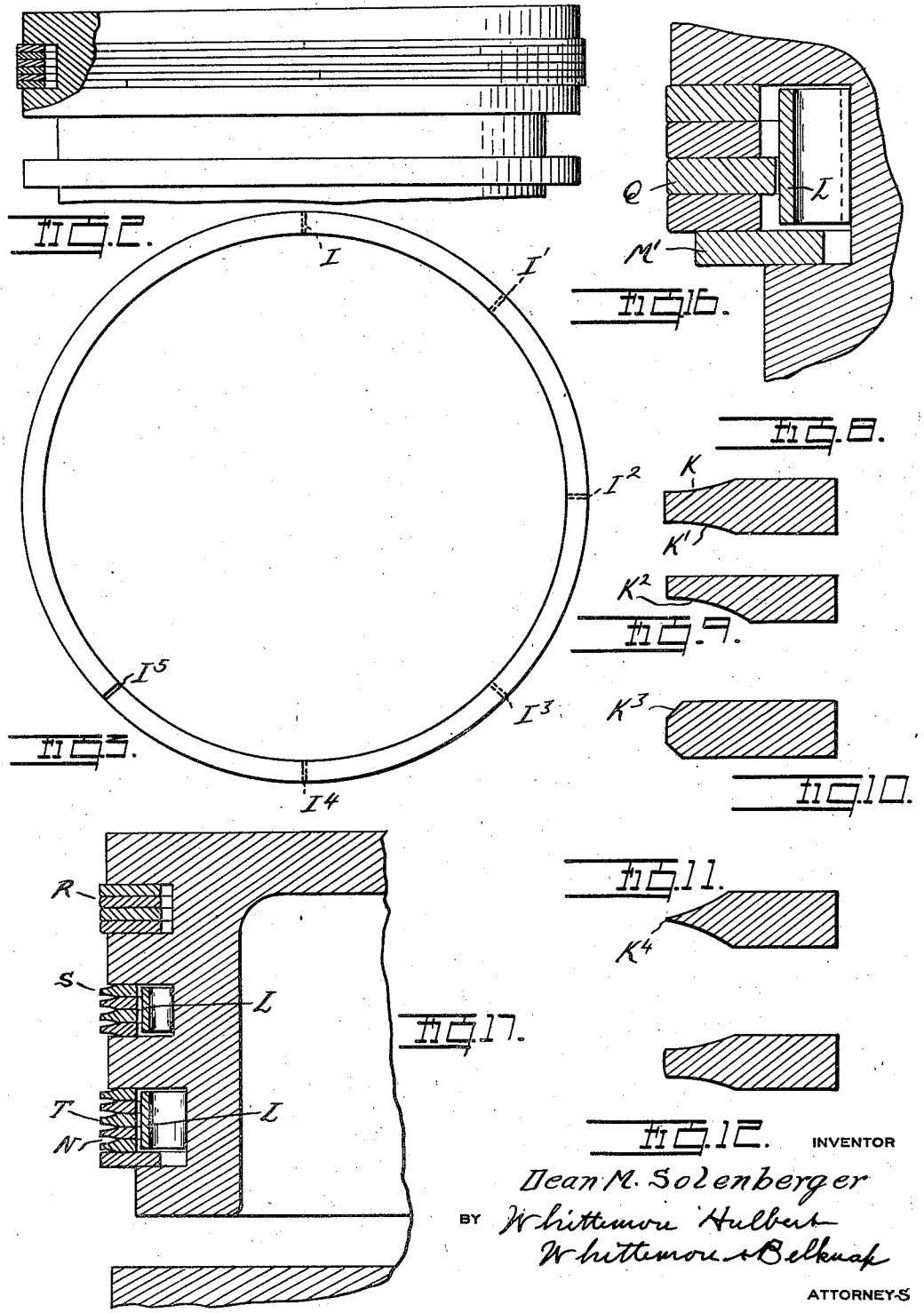

2,068,114

UNITED STATES PATENT OFFICE 2,068,114

PISTON RING

Dean M. Solenberger, Cleveland, Ohio, assignor to The Simplex Piston Ring Company of America, Inc., a corporation of Ohio Application January 29, 1934, Serial No. 708,916

6 Claims. (Cl. 309—29)

The invention relates to piston rings of that type which may be designated as laminated and which consists of a plurality of exceedingly thin split rings placed in series in a ring groove of standard width. It is the object of the present invention to obtain a construction of ring of this general type having various advantageous features, among which are First, the means employed for effective sealing with the sides of the ring groove;

Second, the means for insuring adequate lubrication and at the same time avoiding oil pumping;

Third, the obtaining of a construction of ring which is conformable to an out-of-round cylinder;

Fourth, means for retaining the ring in the ring groove where the landing surface of the latter has been cut away;

Fifth, the means for simultaneously effecting a peripheral seal against the cylinder and also sealing against the bottom of the ring groove;

Sixth, the obtaining of a ring which may be used in the top groove of the piston which is most exposed to the combustion heat.

With these and other objects in view the invention consists in the construction as hereinafter set forth. In my co-pending United States patent application Serial No. 56,570, filed December 28, 1935, I have described and claimed certain features of my improved laminated piston packing and cross-reference is hereby made thereto.

In the drawings:

Fig. 1 is a side elevation of a ribbon helix forming the first step in the manufacture of my laminated ring;

Figs. 1A, 1B, 1C, 1D, 1E and 1F are side elevations of the individual laminae formed from said helix;

Fig. 2 is a sectional elevation of a portion of the piston showing my ring in engagement with the ring groove therein;

Fig. 3 is a plan view of the ring illustrating the break joint arrangement of the laminae;

Fig. 4 is a similar view of a modified construction;

Figs. 5 and 6 are side elevations of the ring viewed at right angles to each other;

Fig. 7 illustrates the manner of assembling a series of laminae of the construction in Figs. 4 and 6;

Figs. 8 to 12 inclusive are enlarged cross sections of individual laminae showing modified constructions thereof;

Figs. 13, 14, 15 and 16 are cross sections through laminated rings in engagement with ring grooves showing various modifications;

Fig. 17 is a longitudinal section through a portion of a piston having three ring grooves and showing laminated rings of different constructions in engagement with said grooves.

Fig. 18 is a side elevation showing the means for preventing interlocking between laminae;

Fig. 19 is a plan view showing means for holding the laminae from relative rotation.

Heretofore rings of the type above referred to have been formed from a flat metallic strip or ribbon wound edgewise in a close coil about a suitable mandrel and subsequently cut longitudinally to sever the convolutions into separate rings. The individual rings thus formed lie substantially in a plane perpendicular to the axis of the mandrel with little tendency to move out from this plane. This is for the reason that in the close wound coil the ends of the rings upon opposite sides of the split are laterally displaced from each other only by the thickness of the metal. Thus when placed in a ring groove a series of such rings will have little if any tendency to press against the sides of the ring groove to insure effective sealing.

My improved construction of ring may be formed in a somewhat similar manner from a flat metallic strip wound edgewise around a mandrel but the individual rings or laminae are so fashioned as to produce axial resiliency in the series which will insure effective sealing against the sides of the groove. At the same time the rings are so fashioned that each radial cross section lies in the plane perpendicular to the axis of the ring so that the laminae will contact with each other and with the sides of the ring groove throughout the entire radial depth. Such a construction may be made in several ways. As shown in Fig. 1, a ribbon A preferably of steel, is wound to form an open helix B and is then severed to form a series of sections C, D, E, F, G, H, as shown in Figs. 1A to 1F inclusive. Each of these sections or laminae has the ends thereof on opposite sides of the split laterally spaced from each other and the inherent resiliency of the metal is such that when these ends are forced into the same plane an axial tension is developed. At the same time each radial cross section in the open helix is perpendicular to the axis thereof so that when the laminae are pressed against each other and against the sides of the ring groove, they will come into contact throughout the entire radial depth. Also the cumulative tension of the laminae is such that the end members will be flattened against the sides of the ring groove throughout the entire circumference thereof while the intermediate laminae will contact with each other throughout a considerable portion of their circumferential length. In arranging the laminae in series the splits are distributed about the circumference of the ring as indicated at I, I', I², I³, I⁴ and I⁵, Fig. 3.

In Figs. 4 to 7 inclusive a modified construction is shown in which instead of forming the individual laminae J, J', etc. of sections of an open helix, they may be formed from a closely wound helix or even from sheet metal stampings. Each section is, however, bowed as shown in Figs. 5 and 6, and these bowed sections when assembled in series are alternately faced oppositely as indicated in Fig. 7. Thus when contracted and placed in the ring groove an axial tension is developed similar to that in the construction previously described.

The thickness of the laminae is so proportioned to the width of the ring groove as to provide slight clearance between individual laminae for a film of oil. This is not, however, of sufficient width to assist in lubricating the surface of the cylinder and consequently there might be danger that some of the intermediate laminae would run dry. To avoid this danger, I preferably fashion the cross section of the laminae so as to reduce the area of peripheral contact and to form a channel between adjacent laminae for holding oil. Figs. 8 to 12 inclusive show various constructions for this purpose. In Fig. 8 the opposite sides are cut away at K and K'. In Fig. 9 one side only is cut away at K². Fig. 10 shows a slight bevel K³ on opposite sides of the periphery which forms the oil groove. Fig. 11 shows an extreme construction where the periphery is cut to a substantially knife edge as indicated at K⁴. Fig. 12 is a construction the same as in Fig. 8, but with the remaining portion of the periphery rounded in cross section. All of these constructions can be easily formed, preferably by grinding or rolling the ribbon before winding the same into the helix.

Engine cylinders are frequently out-of-round and are variously distorted so that a circular ring will not form a perfect seal therewith. To compensate for such irregularities I preferably form the laminae of a radial depth so reduced as to be quite flexible in the plane of the ring. This will diminish the radial expansive pressure of the ring and I therefore develop the required radial pressure by the use of an expander. This is preferably in the form of a corrugated ribbon, such as L, the outer and inner crests of which bear respectively against the laminae and the bottom of the ring groove. By thus reducing the radial depth of the laminae, the landing surface on the sides of the ring groove is correspondingly reduced, and where one side is cut away to some extent there might not be sufficient contact area to retain the ring in the groove. This difficulty I have avoided by placing at one or upon both sides of the ring groove a section of greater depth as indicated at M. This section may not be depended upon for peripheral seal and if desired it may be reduced in external diameter as indicated at M', Figs. 15 and 16. Where such an end section is used, the expander L may be reduced in width so as to bear only upon the laminae which are of reduced radial depth and not against the section M.

Instead of forming the oil grooves in the manner illustrated in Figs. 8 to 12 inclusive, such oil channels may be formed by having the alternate laminae of different external diameters. Thus as shown in Fig. 15, an oil channel N is formed by having one of the laminae O of an external diameter less than the diameter of the cylinder.

For some uses it may be desirable to increase the effectiveness of the seal by a sealing connection with the bottom of the ring groove as well as with the cylinder wall. This is shown in Fig. 14 where the alternate laminae P, P', P², P³ and P⁴ are of such diameters that P, P² and P⁴ seal against the cylinder wall and P' and P³ seal against the bottom of the ring groove. The members P' and P³ are also reduced in external diameter so as to form the oil channels N between the members P, P² and P⁴.

Where an expander is used for developing the radial outward pressure this may be applied either to all of the laminae or to only a portion. As shown in Fig. 16, the pressure is applied to only a single section Q. This will greatly reduce the area of contact so that a comparatively light spring tension in the expander will be all that is required for effecting the seal.

It is the usual practice in engine construction to place a plain ring in the highest groove in the piston which is subjected to the most intense heat. With my improved construction I can use a laminated ring in the upper groove as indicated at R, Fig. 17. For this purpose the laminae are preferably of greater radial depth and are in fairly close contact with each other. The second ring groove is preferably provided with a ring S formed of laminae of reduced radial cross section and cut away to form the oil channels as previously described. Also an expander L is preferably used therewith. The lower ring groove which usually holds an oil ring and which is usually of greater width than the other grooves, is provided with a laminated ring T having a larger number of laminae and with the lower member of increased radial depth to obtain the necessary landing surface where the lower side of the ring groove is cut away. This ring may also be provided with the oil channels N and with an expander L. These several rings in combination will thus produce a very effective seal and will guard against any danger of oil pumping.

In the reciprocation of pistons in engine cylinders, there is a tendency to impart a rotary movement to the rings in the ring grooves. This same tendency is present with the laminated construction of ring, and if the laminae are unrestrained, they will rotate in relation to each other. Assuming that the original arrangement is with the splits in the laminae out of coincidence, during the rotation, the split in one of the laminae will come in registration with that of an adjacent one and due to the axial resiliency the end of one ring may interlock that of the adjacent ring, thus holding the splits in registration. If this action were to continue, all of the laminae would eventually have their splits in registration, which would be objectionable. To avoid such action, I preferably bevel the ends on opposite sides of the split as indicated at U, Fig. 18, so that when one of the laminae passes another there will be nothing to catch and hold the splits in registration. This will permit free rotation of the laminae with little likelihood that the splits would ever remain in registration.

It may be desirable for certain constructions to hold the laminae from rotation. This can be accomplished as illustrated in Fig. 19 by providing the inner periphery with a recess or scallop W. These scallops may be arranged differently with respect to the splits in the different members of the series so that when all of the scallops are in registration the splits will be out of registration. Thus one of the crests of the expander L may be engaged with the aligned scallops and will serve to hold the laminae from relative displacement.

Where the rings have been formed by a rolling operation or the winding of a strip about a mandrel, stresses will be developed in the metal which upon heating will cause it to change in shape. Thus rings in engine cylinders and particularly where they are used in the groove adjacent to the explosion chamber may become heated to a temperature which will cause change in shape. To avoid this I preferably heat treat the rings after original formation, subjecting them to a temperature higher than that which will be attained in the piston groove. After such heat treatment the rings may be reformed to correct any change in shape.

What I claim as my invention is:

1. A piston ring comprising a series of split thin ring sections or laminae, the sides of the ends of said laminae on opposite sides of the split being beveled to avoid interlocking with the ends of adjacent laminae.

2. In combination with a piston having a ring groove therein, a piston ring comprising a series of split ring sections or laminae disposed in said ring groove, the sides of the ends of said laminae on opposite sides of the split being beveled or relieved to avoid interlocking of the ends of adjacent laminae, and an expander spring disposed in said ring groove between the base of said groove and said laminae.

3. In combination, a piston having a ring groove therein, a piston ring comprising a series of split ring sections or laminae disposed in said groove, the sides of the ends of at least a portion of said split ring sections being relieved or beveled, and an expander spring disposed in said ring groove between the base of said groove and said ring sections.

4. A piston sealing device comprising a plurality of superimposed split thin ring sections or laminae, the sides of the ends of each of said laminae being beveled or relieved to avoid interlocking of the ends of adjacent laminae.

5. A piston sealing device for a piston having a ring groove comprising a plurality of superimposed split thin ring sections or laminae, said ring sections being disposed in the ring groove of the piston with the outermost laminae against the sides of the ring groove, the sides of the ends of each laminae being beveled or relieved on opposite sides of the split to avoid interlocking of the ends of adjacent laminae.

6. A piston sealing device adapted for use in a piston having a ring groove comprising a plurality of superimposed split ring sections or laminae, at least a portion of said laminae being of a normal form curved whereby the inherent resiliency of said laminae when compressed into a ring groove will exert an expansive force against the sides of said groove, the sides of the ends of said laminae being beveled or relieved on opposite sides of the split to permit relative rotary movement of the laminae without interlocking of the ends of adjacent laminae.

DEAN M. SOLENBERGER.